United States Patent Office 2,876,524
Patented Mar. 10, 1959

2,876,524

METHOD OF ALTERING THE PHYSICAL CHARACTERISTICS OF LINEAR CONDENSATION POLYMERS WITH ANHYDROUS HYDROGEN HALIDE GAS

Lloyd H. Reyerson, St. Paul, and Lowell E. Peterson, Minneapolis, Minn., assignors to Regents of The University of Minnesota, Minneapolis, Minn., a corporation of Minnesota No Drawing. Application December 8, 1954
Serial No. 474,024

9 Claims. (Cl. 28—72)

This invention relates to a method of altering the physical characteristics of polyamide condensation products. More particularly, this invention relates to a method of improving the crystalline structure of polyamides and imparting a permanent shape to nylon fibers.

It has been discovered that if linear polyamide condensation polymers are made to assume a particular desired configuration and while so disposed are treated with a substantially anhydrous hydrogen halide gas, upon removal of the gas from the polymer it will continue to retain that configuration. For example, nylon fibers wound around a mandrel and exposed to hydrogen chloride were found to retain a permanent crimp or curl after the gas had been removed.

Upon exposure to hydrogen chloride gas nylon yarn undergoes changes in physical appearance and properties: dimensional changes, loss of tensile strength, stickiness, etc. These changes could conceivably be due to either of two causes. First, chain degradation or, secondly, diminution of hydrogen bond cross links between chains, permitting slippage of one chain past another. The fact that the tensile strength and general physical characteristics are restored on desorbing the gas in vacuo suggests that the sorption proceeds without chain degradation, and that the change in physical properties is due to the reversible breaking of hydrogen bonds between chains.

This invention is based upon the discovery that the hydrogen bond cross links between the polyamide chains can be broken and reformed at will. The invention resides more specifically in the discovery that a permanent curl, crimp, or other change of shape can be introduced into the nylon yarn by sorbing substantially anhydrous hydrogen halide gas on or in it, holding the fiber in the desired shape, and desorbing the gas with warming in vacuo.

Broadly stated, this invention comprises the method of altering the physical characteristics of condensation polymers which comprises exposing said polymers, while in a desired new configuration, to an atmosphere of a substantially anhydrous hydrogen halide gas in a closed treating zone at a temperature between about room temperature and about −80° C. for a period of from about several minutes to several hours until at least from about ½ to 2½ moles of hydrogen halide gas per mole of amide linkages in the polymer have been sorbed by the polymers, and then desorbing said gas from the polymers at a temperature between about room temperature and the softening point of nylon under vacuum.

The sorption of hydrogen halide by the polymers may be carried on at any desired positive pressure. For laboratory equipment pressures ranging from about 1 mm. Hg to about 100 cm. Hg were found to produce the desired changes in physical characteristics in reasonable time. Higher pressures may be used where high pressure equipment is available with a corresponding decrease in the required time for treatment.

While substantially anhydrous hydrogen chloride gas is a preferred treating gas from the standpoint of cost, ready availability in commercial amounts of high purity, ease of handling and the like, the invention is not limited to the use of hydrogen chloride alone but also contemplates the use of hydrogen bromide, hydrogen iodide and hydrogen fluoride as well. Hydrogen bromide is a satisfactory material although it works somewhat more slowly. Hydrogen fluoride is difficult to handle because of its extreme reactiveness and its corrosiveness and toxicity. Hydrogen iodide is less reactive and because of the size of its molecule is a less satisfactory treating material than hydrogen chloride. Hydrogen bromide and hydrogen iodide are more easily oxidized and thus are more difficult to maintain pure in the gaseous state.

It has been observed that during early stages of exposure of nylon fibers to hydrogen chloride gas the length of the fibers first decreases, and then, with progressive sorption of the gas, the length increases. The fiber diameter swells from the beginning and increases consistently. Although applicants do not wish to be bound by any particular underlying theory for their invention they offer the following explanation of what is believed to take place. Since in the early stages of sorption the length decreased, there is some orientation of the nylon chains with the fiber axis, as shown by X-ray diffraction studies. The observed swelling of the cross section is what is to be expected if hydrogen chloride molecules are free to enter between amide groups, separating the chains at these points. The shortening of the fiber is due to the tendency of the nylon to be held together by van der Waal's forces in the hydrocarbon sections and to be pushed apart by hydrogen chloride molecules near the amide linkages. This causes the nylon chains to deviate from a straight line and shorten the fiber length.

As sorption proceeds further, the fiber length begins to increase until it has again reached and exceeded its original length. This may be explained by considering a portion of an amorphous region in the fiber where the nylon molecules are held together by hydrogen bonds rather rigidly, but in a tangled array. As the hydrogen bonds between chains are broken in this region the chains are free to fall into place along the faces of neighboring crystals which are preferentially oriented along the fiber axis. The effect of the hydrogen chloride sorption is to anneal the nylon. The retained change in physical characteristics is caused by recrystallization of the nylon fibers.

It is not immediately apparent whether the sorption is restricted to the amorphous regions of the polymer or whether the crystalline regions are also penetrated. The polymer sorbs two molecules of hydrogen chloride for each amide link in the polymer at −78.9° C. and one molecule of hydrogen chloride per amide link at 0° C. and 20° C. This suggests that the entire volume of the polymer is accessible. It may well be that both the carbonyl and the imido groups are possible sorption sites which become important at different temperatures. It is probable that the hydrogen chloride gas may form the hydrochloride of the imido group.

It seems unlikely that sorption of hydrogen chloride gas between hydrocarbon chains of the polymer could be appreciable at low pressures, but diffusion through the hydrocarbon section may provide a means of distributing hydrogen chloride molecules throughout the crystalline regions. The hydrogen chloride molecule has a lower dipole moment and would not necessarily be completely excluded from the regions between hydrocarbon chains as water would be. Simple dipole-dipole interactions between the hydrogen chloride molecule and the polar groups of the polymer might be greater than one would expect on the basis of experience with molecular association between dipoles in a medium of high dielectric constant, such as water, remembering that the attractive force between two dipoles is inversely proportional to the bulk dielectric constant of the medium. In nylon, which has a relatively low dielectric constant of 3.15 (measured at a frequency of 10 mc.), the dipole-dipole interactions must be of considerable importance.

It has also been observed that in the high pressure regions the weight of the sample of nylon exposed to hydrogen chloride gas reached a maximum and then decreased. This may be explained in two ways. Either hydrogen chloride is being sorbed and then desorbed or hydrogen chloride is being sorbed and some other gas is being given off. This phenomen is not simply due to the replacement of tightly held water molecules for the effect was observed at Dry Ice temperatures. If water were liberated at sorption sites at this temperature it would remain frozen in the interior of the sample. Neither infra red nor mass spectra were able to identify any new component in the gas phase in equilibrium with the sample. It is concluded, therefore, that the occurrence of a maximum is due to the sorption of hydrogen chloride followed by a partial desorption of the same gas. Since it is known that hydrogen chloride gas produces some alteration of the sorbent it appears that this alteration of the nylon structure actually decreases the capacity of the nylon for hydrogen chloride.

X-ray diffraction photographs provide further evidence that hydrogen chloride is able to produce permanent changes in the nylon structure. Whereas X-ray diffraction photographs of samples of untreated nylon usually show two smeared rings, characteristic of the distance between chains, the picture of nylon from which hydrogen chloride gas has been desorbed show more distinct rings. This appears to confirm the suggestion that sorption and desorption of hydrogen chloride gas causes an annealing process to take place, similar to high temperature annealing.

A change occurs in the diffraction pattern as anhydrous hydrogen chloride is progressively added to the nylon. The exact nature of the X-ray pattern seems to depend upon the amount of hydrogen chloride which has been sorbed. The number of lines as well as the sharpness is increased by initial sorption of hydrogen chloride. This must mean that the chlorine atoms, which have a high scattering power for X-rays, are located at definite intervals along the lattice and that the hydrogen chloride does not initially destroy the crystallinity of the nylon. After the addition of about a mole of hydrogen chloride gas per mole of amide groups, further sorption of hydrogen chloride does seem to decrease the crystallinity, as evidenced by the decrease in number and sharpness of lines.

When nylon yarns are wound around glass rods and exposed to the effects of hydrogen chloride gas and then subjected to a vacuum at an elevated temperature the yarns receive a permanent curl which neither tension nor washing in hot or cold water removes.

As shown in the following examples the amount of hydrogen chloride sorbed by nylon is a function of temperature and pressure. At constant low pressure the amount of hydrogen chloride gas sorbed increases as the temperature decreases. At constant temperature sorption increases with increased pressure. Thus, depending upon pressure and temperature conditions the exposure time to which the yarn is to be subject varies from 2 to 5 minutes at low temperature and relatively high pressure to up to an hour or more at room temperature and low pressure.

If the change is to be permanent, it is imperative that all of the hydrogen halide gas be completely desorbed from the polymers. The desorption may be carried out in vacuo at temperatures from about room temperature to approaching the softening point of the polymer. It has been found that desorption is accelerated at elevated temperatures. The desorption may conveniently be carried out at temperatures between about 50° C. and 110° C., preferably between about 70° C. and 90° C. for a period of from about one hour to overnight (or about 16 hours).

The invention is illustrated, but not limited, by the following examples:

Example 1

Four samples of bright 66 nylon yarn (hexamethylene salt of adipic acid polymer) were wound on 4 mm. glass rods, placed in a glass pressure vessel and pumped dry in a vacuum line. Dry hydrogen chloride gas at 90 cm. Hg pressure was admitted to the vessel for 15 minutes and pumped off. Pumping was continued overnight while the samples were heated to 90° C. Four control samples were treated in the same manner except for exposure to the hydrogen halide gas.

The yarn samples were unwound from the mandrels. Both the hydrogen chloride treated yarns and the control samples retained a curl, but a real difference existed in the permanence of the curl. One treated sample and one control sample were allowed to hang for 2-3 days simply supporting their own weight. The hydrogen chloride treated yarn retained its curl but under the tension of only its own weight the control sample lost much of its curl. Similar treated and untreated control yarns were held taut for 4 hours with a 1.5 gram weight and then unloaded. The hydrogen chloride sample retained its curl but virtually all of the curl was removed from the control sample.

Still another treated yarn sample and a control sample were immersed in water for 3 hours and dried before being unwound from their spools and hung up. The water removed virtually all of the curl from the untreated yarn while not appreciably affecting that which had been treated with hydrogen chloride gas. Two additional samples were first removed from their spools and then soaked in very hot water (95° C.) for five minutes. Here too, virtually all of the curl was removed from the untreated control sample while the yarn exposed to hydrogen chloride gas retained the configuration it assumed on the mandrel. Even after hanging for 15 days the treated samples were not appreciably changed.

Example 2

The sorption of hydrogen chloride gas on nylon was observed at 20° C. from 0 cm. Hg pressure to 81.7 cm. Hg with the following results:

| At: | Mg. HCl/g. nylon |
|---|---|
| 0.135 cm. Hg | 142 |
| 0.390 cm. Hg | 254 |
| 1.06 cm. Hg | 316 |
| 3.95 cm. Hg | 360 |
| 10.8 cm. Hg | 393 |
| 25.1 cm. Hg | 416 |
| 50.3 cm. Hg | 442 |
| 81.7 cm. Hg | 466 |

Example 3

The sorption of hydrogen chloride gas on nylon was observed at 0° C. from 0 cm. Hg pressure to 84.4 cm. Hg with the following results:

| At: | Mg. HCl/g. nylon |
|---|---|
| 0.17 cm. Hg | 82 |
| 0.20 cm. Hg | 189 |
| 0.39 cm. Hg | 307 |
| 3.29 cm. Hg | 397 |
| 9.58 cm. Hg | 445 |
| 20.2 cm. Hg | 483 |
| 41.1 cm. Hg | 505 |
| 68.9 cm. Hg | 523 |
| 84.4 cm. Hg | 534 |

When the yarn sample was allowed to return to equilibrium, before desorption, the nylon was found to retain 288 mg. HCl/g. nylon, almost one mole per mole of amide linkages.

Example 4

The sorption of hydrogen chloride gas on nylon was observed at −78.9° C. from 0 cm. Hg to 91.9 cm. Hg with the following results:

| At: | Mg. HCl/g. nylon |
|---|---|
| 0.14 cm. Hg | 442 |
| 1.55 cm. Hg | 717 |
| 3.40 cm. Hg | 790 |
| 9.15 cm. Hg | 917 |
| 20.2 cm. Hg | 1072 |
| 39.4 cm. Hg | 1222 |
| 53.4 cm. Hg | 1305 |
| 74.4 cm. Hg | 1455 |
| 91.9 cm. Hg | 1634 |

It is interesting to note that at this temperature when the nylon was allowed to return to equilibrium before desorption, at zero pressure it retained 610 mg. HCl/g. nylon, or almost two moles of hydrogen chloride per mole of peptide groups in the nylon.

Example 5

The amount of hydrogen halide gas sorbed by nylon at a constant low pressure as a function of temperature was observed with the following results:

| At 1 cm. Hg at: | Mg. HCl/g. nylon |
|---|---|
| 20.1° C. | 251 |
| 0 | 276 |
| −17.2 | 308 |
| −32.7 | 347 |
| −42.8 | 386 |
| −62.6 | 441 |
| −78.5 | 505 |

Example 6

Samples of nylon yarn were wound around glass rods and placed in a glass pressure vessel and pumped dry in a vacuum line. A mixture of dry hydrogen bromide gas and dry air were admitted to the vessel at about 90 cm. Hg for several minutes and then pumped off. Pumping was continued for several hours while the samples were heated to about 90° C. The yarn samples were observed to undergo substantially the same changes in characteristics as those treated with hydrogen chloride in the examples above. The yarns retained the residual curl imparted by being wound around the glass rods.

During the course of each of the examples the same characteristic changes in physical appearance and properties, such as dimensional changes, loss of tensile strength, stickiness and the like, were observed upon exposure of the yarns to the hydrogen halide gas. Similarly the same characteristic result was observed upon desorption of the gas. While well adapted for changing the shapes of nylon materials the process of this invention is also equally useful for improving and modifying the crystalline structure of the polymers without changing their shapes.

The process of this invention is by no means limited to altering the physical characteristics of nylon fibers or yarns but likewise is adapted to treatment of film and sheet materials, rods, tubes and the like.

It is apparent that many modifications and variations of this invention as hereinbefore set forth may be made without departing from the spirit and scope thereof.

The specific embodiments described are given by way of example only and the invention is limited only by the terms of the appended claims.

What we claim is:

1. A method of altering the physical characteristics of linear polyamide condensation polymers which comprises exposing said polymers to an atmosphere of substantially anhydrous hydrogen halide gas and then desorbing said gas from the polymers.

2. The method of claim 1 further characterized in that the hydrogen halide gas is hydrogen chloride.

3. The method of claim 1 further characterized in that the polymers are exposed to said gaseous atmosphere at a temperature between about room temperature and −80° C.

4. The method of claim 1 further characterized in that the desorption is carried on in vacuo at an elevated temperature from about 50° C. to 110° C.

5. The method of claim 1 further characterized in that the polymers are exposed to said hydrogen halide gas for a time from about 2 minutes to 2 hours sufficient to permit the polymers to sorb at least from about ½ to 2½ moles of hydrogen halide gas per mole of amide linkages in the polymers.

6. A method of altering the physical characteristics of linear polyamide condensation polymers which comprises exposing said polymers to an atmosphere of a substantially anhydrous hydrogen halide gas in a closed treating zone at a temperature between about room temperature and −80° C. for a period of about 2 minutes to 2 hours until at least from about ½ to 2½ moles of hydrogen halide gas per mole of amide linkages in the polymer have been sorbed by the polymers, and then desorbing said gas from the polymers at an elevated temperature between about 50° C. and 110° C. under vacuum.

7. The method of claim 6 further characterized in that the hydrogen halide gas is hydrogen chloride.

8. A method of imparting a permanent curl to nylon yarns which comprises subjecting the yarns to the desired new curled configuration, exposing the yarns while so subjected to an atmosphere of substantially anhydrous hydrogen chloride gas in a closed treating zone at a temperature between about room temperature and −80° C. and at a pressure between about 1 mm. and about 100 cm. Hg for a period of time sufficient to permit the sorption of at least from about ½ to 2½ moles of hydrogen chloride gas per mole of amide linkages in the nylon, and then desorbing the hydrogen chloride from the yarns in vacuo at an elevated temperature below the softening point of the yarns.

9. The method of claim 8 further characterized in that said elevated desorption temperature is between about 70° C. and 90° C.

References Cited in the file of this patent
UNITED STATES PATENTS

| 2,130,523 | Carothers | Sept. 20, 1938 |
| 2,217,113 | Hardy | Oct. 8, 1940 |
| 2,251,508 | Watson | Aug. 5, 1941 |

OTHER REFERENCES

Elod et al.: Textilberichte, 1942, 23, 437–440 through Chem. Abstr., 1944, 38, 24935.

"Textile Manufacturer," September 1952, pages 471, 472.